United States Patent
Kaufman

(10) Patent No.: US 9,756,020 B2
(45) Date of Patent: Sep. 5, 2017

(54) PERSISTENT UNIFORM RESOURCE LOCATORS (URLS) FOR CLIENT APPLICATIONS ACTING AS WEB SERVICES

(71) Applicant: Microsoft Technology Licensing, LLC, Redmond, WA (US)

(72) Inventor: Matthew T. Kaufman, Bonny Doon, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 57 days.

(21) Appl. No.: 14/697,161

(22) Filed: Apr. 27, 2015

(65) Prior Publication Data

US 2016/0315910 A1 Oct. 27, 2016

(51) Int. Cl.
*H04L 29/06* (2006.01)
*H04L 29/08* (2006.01)
(Continued)

(52) U.S. Cl.
CPC ........ *H04L 63/029* (2013.01); *H04L 61/1511* (2013.01); *H04L 63/08* (2013.01);
(Continued)

(58) Field of Classification Search
CPC ....... H04L 63/08; H04L 29/06; H04L 9/3271; G06F 11/1456
(Continued)

(56) References Cited

U.S. PATENT DOCUMENTS 5,944,790 A 8/1999 Levy
7,117,526 B1 * 10/2006 Short .................. G06Q 20/3674
380/281
(Continued)

FOREIGN PATENT DOCUMENTS

| CA | 2408589 A1 * | 4/2003 | ............ H04L 9/321 |
|---|---|---|---|
| JP | 2003196240 | 7/2003 | |
| WO | 2006101402 A1 | 9/2006 | |

OTHER PUBLICATIONS

"International Search Report & Written Opinion Received for PCT Application No. PCT/US2016/029269", Mailed Date: Jul. 14, 2016, 10 Pages.
(Continued)

*Primary Examiner* — Hadi Armouche
*Assistant Examiner* — Bryan Wright

(57) ABSTRACT

Techniques to provide persistent uniform resource locators (URLs) for client applications acting as web services are described herein. In one or more implementations, the techniques utilize standard protocols and libraries (e.g., standard HTTP) without relying upon custom/propriety plug-ins. An intermediary server functions as a tunnel service is configured to provide functionality for handling communications between endpoints on behalf of client applications. Additionally, the tunnel service provides a mechanism to generate and assign persistent URLs (or comparable addresses) to client applications. Entities seeking to interact with the client applications use corresponding URLs to direct requests via the tunnel service and down to the appropriate client application. Local storage associated with the client application is employed to store the credentials, such that the URL persists across multiple sessions and the same URL is generated repeatedly by the tunnel service each time corresponding and valid credentials are supplied by a client.

20 Claims, 8 Drawing Sheets

(51) Int. Cl.
*H04L 29/12* (2006.01)
*H04L 9/32* (2006.01)

(52) U.S. Cl.
CPC ........ *H04L 63/0823* (2013.01); *H04L 63/168* (2013.01); *H04L 67/02* (2013.01); *H04L 9/3271* (2013.01)

(58) Field of Classification Search
USPC .......................................................... 726/10
See application file for complete search history.

(56) References Cited

U.S. PATENT DOCUMENTS

| | | | | |
|---|---|---|---|---|
| 7,853,643 | B1* | 12/2010 | Martinez | H04L 29/06 709/201 |
| 8,032,609 | B2 | 10/2011 | Rogers et al. | |
| 8,707,418 | B2* | 4/2014 | Mokrushin | H04L 9/3271 713/156 |
| 8,924,505 | B2* | 12/2014 | Molland | H04L 29/08846 709/217 |
| 9,154,485 | B1* | 10/2015 | Fallows | H04L 63/08 |
| 9,317,259 | B2* | 4/2016 | Chandrasekharan | G06F 8/36 |
| 2002/0069366 | A1 | 6/2002 | Schoettger | |
| 2005/0160161 | A1* | 7/2005 | Barrett | H04L 63/20 709/223 |
| 2006/0235986 | A1* | 10/2006 | Kim | G06F 8/20 709/229 |
| 2008/0263126 | A1* | 10/2008 | Soman | G06F 17/30887 709/201 |
| 2009/0288138 | A1* | 11/2009 | Kalofonos | H04L 9/3073 726/2 |
| 2010/0223462 | A1 | 9/2010 | Do et al. | |
| 2012/0066256 | A1 | 3/2012 | Ramamurthi et al. | |
| 2012/0079221 | A1* | 3/2012 | Sivasubramanian | G06F 11/1456 711/162 |
| 2013/0275492 | A1* | 10/2013 | Kaufman | H04L 63/029 709/203 |
| 2014/0282903 | A1* | 9/2014 | Singh | H04L 63/08 726/4 |

OTHER PUBLICATIONS

"Blackboard and other VLEs", Retrieved From: <http://www.imperial.ac.uk/admin-services/library/learning-support/copyright-guidance/blackboard-and-other-vles/> Mar. 4, 2015, 3 pages.
"Cisco: Provisioning", Retrieved From: <http://www.cisco.com/c/en/us/td/docs/voice_ip_comm/cuipph/8831/3PCC/english/adminguide/8831-3pcc-ag/provisioning.html> Mar. 4, 2015, Nov. 3, 2014, 10 pages.
"CloudFlare Keyless SSL", Retrieved From: <https://www.cloudflare.com/keyless-ssl> Feb. 24, 2015, 2 pages.
"Dimdim, A Newer Solution for Web Conferencing at a Lower Cost", Retrieved From: <http://strengtheningnonprofits.org/resources/e-learning/online/virtualmeetings/default.aspx?chp=4> Mar. 4, 2015, 2010, 2 pages.
"Exposing Web Services to Client Script", Retrieved From: <https://msdn.microsoft.com/en-us/library/bb398998(v=vs.90).aspx> Feb. 24, 2015, Dec. 14, 2010, 5 pages.
"OpenContentURL: Enabling Integration and Linking Between Systems", Retrieved From: <http://www.tsgrp.com/Open_Source/OpenContentURL/open-content-url.jsp> Mar. 4, 2015, Oct. 26, 2011, 1 page.
"TLS Handshake Protocol", Retrieved From: <https://msdn.microsoft.com/en-us/library/windows/desktop/aa380513(v=vs.85).aspx> Mar. 4, 2015, Oct. 26, 2011, 2 pages.
"WebEx Personal Meeting Rooms", Available at: <http://www.towson.edu/adminfinance/ots/Training/documentation/Webex/WX42WebExPersonalMeetingRooms.pdf>, Jan. 26, 2015, 6 pages.
"International Preliminary Report on Patentability", Application No. PCT/US2016/029269, Mar. 20, 2017, 6 pages.

* cited by examiner

PERSISTENT UNIFORM RESOURCE LOCATORS (URLS) FOR CLIENT APPLICATIONS ACTING AS WEB SERVICES

BACKGROUND

When web servers conduct transactions with each other, a very common programming pattern is to use HTTP as the transport. For example, a first server may issue an HTTP GET request to request a representation of a particular resource from a second server. The second server can, in turn, respond with the resource representation. Transactions between servers can also take place in a more asynchronous manner. For example, the first server may issue an HTTP GET request and provide a return URL for the second server to use in responding. At some later time, the second server can asynchronously return to the first server using the URL provided by the first server. This process can also easily operate in reverse between the servers.

Using this same model, transactions between client side applications, such as web browsers, and servers can operate with the client side application issuing an HTTP GET request and receiving a response from the server. Traditionally, though, servers cannot issue HTTP GET or POST requests to client side applications (e.g. a web browser) at least because client side applications are not able to act as web servers. Additionally, firewalls or other mechanisms such as Network Address Translation (NAT) devices interfere with traffic directed to clients making it difficult and/or impossible for web service like transactions to take place directly via client applications. While a proxy service can be used to provide some capabilities for client applications to act as web services, existing approaches are typically limited to providing short-lived and/or session-by-session addressing for such client applications. In this approach, each time a client starts a session a different address (e.g., URL) is assigned and the address changes between sessions. As a consequence, considerable time and processing resources are expended to set-up a client as a web service for each individual session and asynchronous transactions across multiple sessions may not be possible.

SUMMARY

Techniques to provide persistent uniform resource locators (URLs) for client applications acting as web services are described herein. In one or more implementations, the techniques utilize standard protocols and libraries (e.g., standard HTTP) without relying upon custom/propriety code or plug-ins. An intermediary server that functions as a tunnel service configured to provide functionality for handling communications between endpoints on behalf of client applications. Additionally, the tunnel service provides a mechanism to generate and assign persistent web service URLs (or comparable addresses) to client applications. Clients and servers seeking to interact with the client applications use corresponding web-service URL to direct requests via the tunnel service and down to the appropriate client application. Local storage associated with the client application can be employed to store the credentials and/or data indicative of the URL, such that the URL persists across multiple sessions and the same URL is generated repeatedly by the tunnel service each time corresponding and valid credentials are supplied by a client.

This Summary is provided to introduce a selection of concepts in a simplified form that are further described below in the Detailed Description. This Summary is not intended to identify key features or essential features of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
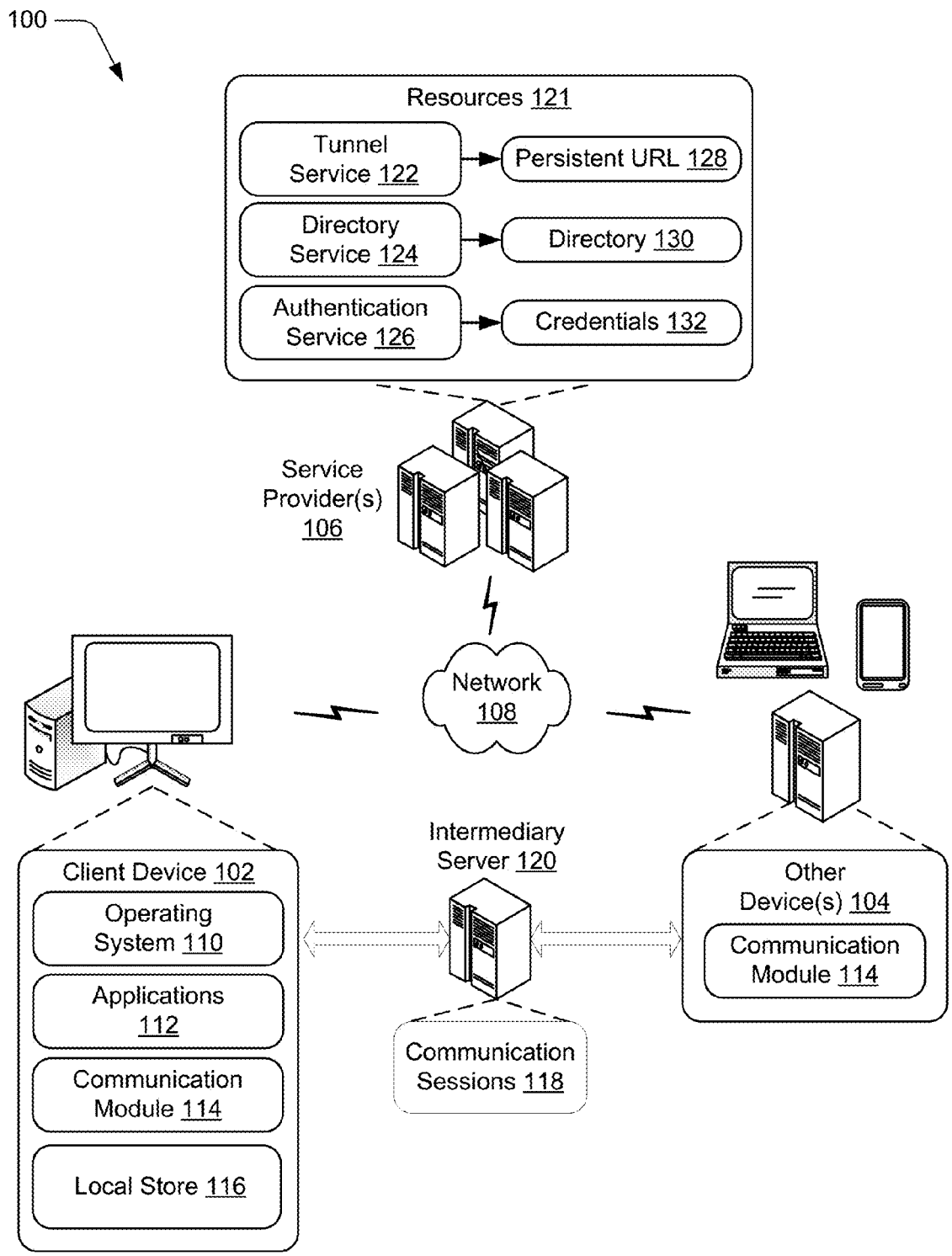
FIG. 1 is an illustration of an environment in accordance with one or more implementations.

While a proxy service can be used to provide some capabilities for client applications to act as web services, existing approaches are typically limited to providing short-lived and/or session-by-session addressing for such client applications. In this approach, each time a client starts a session a different address (e.g., URL) is assigned and the address changes between sessions. As a consequence, considerable time and processing resources are expended to set-up a client as a web service for each individual session and asynchronous transactions across multiple sessions may not be possible. Additionally, changing the URL for each session also means that the changed URL has to be re-registered with any registrar or directory service that is used to map hostnames, usernames, or other identifiers to the URL.

Techniques to provide persistent uniform resource locators (URLs) for client applications acting as web services are described herein. In one or more implementations, the techniques utilize standard protocols and libraries (e.g., standard HTTP) without relying upon custom/propriety code or plug-ins. An intermediary server that functions as a tunnel service is configured to provide functionality for handling communications between endpoints on behalf of client applications. Additionally, the tunnel service provides a mechanism to generate and assign persistent web service URLs (or comparable addresses) to client applications. Clients and servers seeking to interact with the client applications use corresponding web-service URLs to direct requests via the tunnel service and down to the appropriate client application. Local storage associated with the client application can be employed to store the credentials and/or data indicative of the URL, such that the URL persists across multiple sessions and the same URL is generated repeatedly by the tunnel service each time corresponding and valid credentials are supplied by a client. In this manner, the life of a persistent URL is tied to the validity of the credentials rather than being a short-lived, temporary URL that expires when a session is concluded.

In one example approach, the tunnel service receives credentials supplied by a particular client application to establish communication sessions through the tunnel service. The tunnel service ascertains validity of the credentials supplied by the client application. When the credentials are valid, the tunnel services extracts an identifying string indicated by the credentials and generates a persistent URL for use by the client application that incorporates the identifying string that is extracted. The persistent URL is returned by the tunnel service to the client application and is effective to enable the client application to operate through the tunnel service as a web service using the persistent URL as is its web address, which can be published privately or publicly. The tunnel service routes communications between endpoints for communication sessions established through the tunnel service the tunnel service using an encapsulated request and response structure, including directing traffic for the particular client application using the corresponding persistent URL.

The techniques described in this document can be employed for a multitude of practical uses. For example, the various implementations enable client based web services using standard web-services technologies. In addition, techniques can be utilized by any suitably configured device including, by way of example and not limitation, embedded devices. For example, such embedded devices can take the form of those that can be employed in a variety of scenarios such as "smart home" or "smart office" scenarios where, for example, a device such as a light switch can be configured as an embedded device to offer and consume web services as described in this document. Since the assigned URLs persist across multiple sessions, the amount of time, network traffic, and processing resources consumed to set-up a client as a web service can be reduced in comparison with set-up for each session individually. Additionally, URLs that persist across multiple sessions enable client applications to engage in asynchronous transactions like tradition servers.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a client device 102, other device 104, and a service provider 106 that are communicatively coupled via a network 108. The client device 102, other device 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 8.

Although the network 108 is illustrated as the Internet, the network may assume a wide variety of configurations. For example, the network 108 may include a wide area network (WAN), a local area network (LAN), a wireless network, a public telephone network, an intranet, a peer-to-peer network, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with client devices are contemplated including, but not limited to, a productivity suite that integrates multiple office productivity modules, a web browser, games, a multi-media player, a word processor, a spreadsheet program, a photo manager, and so forth. In accordance with techniques described herein, at least some application 112 are configured to operate as web services.

The client device 102 and other device 104 are each illustrated as including a communication module 114. The communication modules are representative of functionality to enable various kinds of communications via the network 108. Communication modules 114 are also representative of client applications that can operate as web services in the manner described above and below. Examples of the communication modules include but are not limited to a browser to access web content, a voice communication application (e.g., a VoIP client), a video communication application, an instant messaging application, a content sharing application, other web-enable applications, and combinations thereof. The communication module 114 for instance, enables different communication modalities to be combined to provide diverse communication scenarios. This includes but is not limited to implementing integrated functionality for web browsing, user presence indications, video communications, online collaboration and meeting experiences, instant messaging (IM), and voice calling. Further, the communication module may be operable to access online resources (e.g., content and services), browse web pages and sites, establish communication connections with service providers and other clients, and so forth. In at least some implementations, the communication module 114 represents an application that is deployed to and installed locally on a client device. Additionally or alternatively, the communication module 114 may be implemented all or in part as a remote application that is accessed and executed via a web browser (e.g., a web application), as a remote service from a provider, using peer-to-peer techniques, and so forth.

The client device 102 may also include local storage 116. The local storage 116 represents storage implemented by the client device 102 in any suitable form. At least some portions of the local storage 116 may be allocated to or otherwise associated with applications 112 including a communication module 114. As described in greater detail below, local storage 116 can be utilized to store credentials and/or a persistent URL assigned to a client application to facilitate operations of the client application as web service.

Further, the communication module 114 may be used to establish communication sessions 118 between endpoints such as between a service provider and one or more clients, between different web services, between a client and server, and/or directly between clients. For example, communication sessions 116 may enable exchange of various messages, media streams (e.g., audio/video), content, and so forth between endpoints as represented in FIG. 1. In one or implementations, communication sessions 118 represent web-based real-time communication that occurs using communication modules 114 that may be configured as web browsers, cloud-based web applications, client applications, or otherwise. As noted, communication sessions 118 can also include asynchronous transactions between devices and corresponding software of the devices, including communications between web services and other endpoints.

Communication sessions 118 between endpoints for some interaction scenarios can be supported via an intermediary server 120 as represented in FIG. 1. The intermediary server 120 may be implemented via one or more server devices associated with one of the service providers 106. The intermediary server 120 can be configured to implement a tunnel service as described in this document that is identified by a tunnel endpoint. Client applications can register with intermediary server 120 and tunnel service, such as by using a tunnel ID.

Communication modules 114 and other suitably configured applications 112 use techniques described in this document to communicate, e.g., HTTP methods, as well as a variety of persistent connection types for the client. For example, a client device 102 can be configured to establish a persistent connection with intermediary server 120. Any suitable technology can be utilized to enable the persistent connection to be established. In implementations discussed herein, communication sessions are enabled through the tunnel service using a tunnel ID in the form of a persistent URL or comparable addressing mechanism that is allocated to a client application.

In operation, a calling endpoint such as the other client 104 utilizes standard web protocols, such as HTTP or HTTPS, to call the intermediary server 120 using standard protocols and formats. This can be done without any modifications to the standard HTTP techniques that are utilized to communicate. The call issued by the calling includes information indicative of the tunnel endpoint associated with intermediary server 120, the tunnel ID or other suitable identifier associated with the client device 104 and a payload which identifies a web service implemented by a client application (e.g., communication module 114 or application 112). In one or more implementations, the call is routed to the proper tunnel endpoint based upon a host name contained in the persistent URL that is mapped via a dynamic domain name system (DNS) component or other suitable directory to the appropriate tunnel server. The call may additionally include data or information that is to be processed by the web service implemented by the client application.

The intermediary server 106 processes the call by converting it into a standard web structure that can be processed by the client application. For example, the intermediary server 120 can serialize the call and encapsulate it in a standard web structure. The encapsulated structure is then communicated by the intermediary server 120, by way of the persistent connection, to the client application for processing. When the client application receives the encapsulated structure, it can utilize a library to fire an event including the data or information received in the encapsulated structure to the web service for processing. Once the data or information is processed by the web service, the client application formulates a response that includes an encapsulated structure having a payload. The formulated response is sent to the intermediary server 120. The formulated response can be sent to the intermediary server using a standard connection such as a TCP connection. The intermediary server 120, in turn, processes the response and formulates an HTTP response that is then communicated back to the calling endpoint. As discussed in greater detail below, the intermediary server 120 is configured to utilize persistent URLs that are assigned to client applications to route calls to appropriate web services implemented by the client applications.

The service providers 106 as depicted in FIG. 1 include functionality operable to manage various resources 121 that may be made available over the network 108. For example, service provider 106 may provide various resources 121 via webpages (e.g., resource pages), user interfaces, and data that are communicated over the network for processing an output by one or more clients via a web browser or other client application. The service providers 106 are configured to manage access to the resources 121, performance of the resources, and configuration of user interfaces to provide the resources 121, and so on. The service provider 106 may represent one or more server devices used to provide the various resources 121, including at the intermediary server 120 as described herein.

Generally, resources 121 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 121. Content may include various combinations of text, multi-media streams, documents, application files, photos, audio/video files animations, images, web pages, web applications, device applications, content for display by a browser or other client application, and the like. Various different resources 121 and services can be provided by the same service provider, by one or multiple services, and/or via multiple different service providers.

In connection with techniques for enabling clients to provide web services described herein, resources 121 provided by one or more service providers may include at least a tunnel service 122, a directory service 124, and an authentication service 126 that operate as described above and below. The tunnel service 122 may be implemented via an intermediary server 120 to facilitate communication sessions 118 as previously discussed. The tunnel service 122 is also represents functionality to assign persistent URL(s) 128 to clients, manage the URLs, and route traffic between endpoints using the URLs as discussed in this document.

The directory service 124 represents functionality to implement a directory 130 that map names or other suitable identifiers of network resources to their respective network addresses. The directory 130 enables look-ups to obtain addresses for corresponding to resources. An address for a particular resource can be resolved using a known resource name to look-up the address from the directory through the directory service 124. Thus, users do not have to remember or input a complete address to interact with a particular resource. Additionally, the directory service 124 enables addresses such as the persistent URLs 128 described in this document to be dynamically assigned to resources, such as a client application acting as a web service. Thus, the resource remains reachable through the mapped name-address pair maintained by the directory service 124, even if the address dynamically changes.

In one or more implementations, the directory service 124 is configured to support standard DNS protocols. As such, the directory service 124 can be reached via and respond to standard DNS queries. In this way, hostnames that are incorporated into persistent URLs are dynamically mapped to corresponding resources and traffic directed to the URLs are automatically routed to the appropriate server(s) of the tunnel service 122. In particular, the directory service 124 may be configured as a dynamic domain name system (DNS) component configured to map a persistent URL to a DNS name associated with the web service and an IP address of a corresponding server of the tunnel service that is hosting the web service.

The authentication service 126 represents functionality operable to resolve a user's identity to control access to resources. The authentication service 126 may be provided by a service provider from which resources are sought, as a standalone service, or otherwise. The authentication service implements an authentication sequence using various protocols to determine that a user seeking access to resources is who they claim to be and/or are authorized to access the resources.

For example, the authentication service 126 may operate to assign and manage credentials 132 such as a digital certificate, public-private key pair, user ID and password, and so forth. The authentication service 126 operates to verify asserted credentials against credentials that are maintained in association with accounts as user account data. When the authentication is successful (e.g., the client "is who they say they are"), the authentication service may issue a token(s) (e.g., TGTs, encrypted blobs, cookies, and/or other suitable sign-on credentials) to enable access to corresponding resources. Example authentication protocols that may be utilized include but are not limited to Kerberos, Active Directory Federation Services (ADFS), and Host Identity Protocol (HIP), to name a few.

A single authentication may correspond to one or more resources, such that authentication to a single account by a "single sign-on" may provide access to individual resources, resources from multiple service providers, and/or to an entire suite of resources available from a service provider 106. Thus, upon successful verification of the credentials, the computing device may be logged-in to a user account and therefore may be given access to resources authorized for the account. If the authentication service is unable to verify the credentials, access to the resources is denied, a prompt to retry authentication may be output, and so forth.

In accordance with techniques describe herein, a digital certificate indicative of a credentials 132 is stored in a local store 116 associated with a client applications, such as a communication module 114. The credentials 132 may be used with a tunnel service 122 to obtain a corresponding persistent URL 128. Since the credentials 132 are stored in a local store 116, the client is able to utilize the credentials repeatedly during a validity period for the credentials to obtain the same persistent URL. In this way, the persistent URL 128 is tied to the credentials 132 rather than being a temporary, per-session address that is valid for just a single session. As such, the persistent URL 128 persists across multiple sessions and enables a client to engage in asynchronous transactions as a web service. Details regarding these and other aspects of techniques related to persistent URLs for client applications acting as web services are discussed in relation to the following figures.

Having considered an example operating environment, consider now a discussion of details, examples and procedures regarding provision and utilization of persistent URLs for client applications acting as web services in accordance with one or more implementations.

Persistent URLs for Client-Based Web Services Details

In the following section, implementation details and example techniques for are discussed. The discussion includes some an example procedure(s) that can be implemented in connection with any suitable hardware, software, firmware, or combination thereof. In at least some embodiments, the procedures may be implemented by way of a suitably configured computing device that includes or otherwise makes use of a communication module 114 and local storage 116. Aspects of the procedures may also be implemented by a client device 102, a server of a service provider 106 (e.g., intermediary server 120) and/or by functionality that is distributed between a service provider 106 and a computing device 102.

Using this techniques described in this document, web services supported by client applications that reside behind a firewall can be utilized and appear as completely functional HTTP endpoints. Further, by utilizing standard protocols, a calling endpoint and a target client application can communicate through NATs or other devices which would otherwise make such communication impossible. Further, because the described approach utilizes standard protocols, no additional plug-ins or special technology is utilized to effect communication, as will be appreciated by the skilled artisan.

Figure 2:
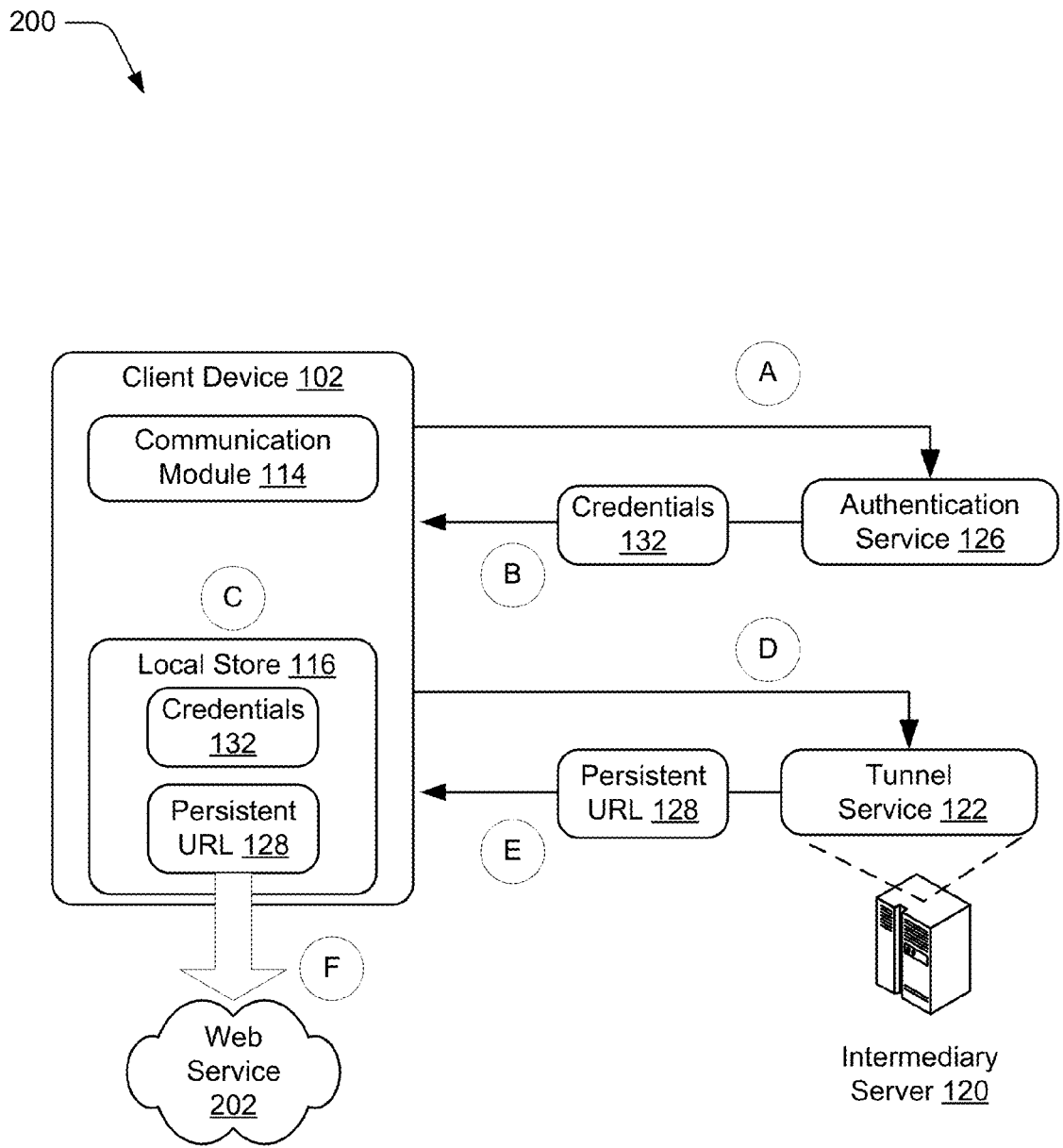
FIG. 2 is an illustration of an example scenario in accordance with one or more implementations.

FIG. 2 is illustrates generally at 200 of an example scenario in which a client application operates as a web service 202 in accordance with one or more embodiments. In particular, FIG. 2 represents example operations involved in establishing a persistent URL usable to expose a client as a web service. Example operations are represent using letter "A" to "F". At A, a communication module 114 (or other client application) of a client device 102 interacts with an authentication service 126 to obtain credentials 132. Based on interaction to sign-up for different resources 121 available from one or more providers, the authentication service 126 assigns corresponding credentials 132 at B. The credentials 132 for example may be usable to gain access to a tunnel service 122 as well as other resources. Further, the credentials 132 can be provided to obtain a persistent URL from the tunnel service 122 that enables the communication module 114 to act as the web service 202. By way of example, the credentials 132 in one or more implementations are configured as a digital certificate signed by a certificate authority associated with a public-private key pair assigned to the client application. The digital certificate may have a relatively long validity period of days, months, or even years that allows repeated use to access resources and obtain a persistent URL, as long as the certificate remains valid. In addition or alternatively, the credentials 132 may be configured as a username and password combination for access to the tunnel service 122.

As further represented in FIG. 2, at C the credentials 132 are stored in a local store 116 associated with the communication module 114. Storing the credentials enables the communication module 114 to access and utilize the credentials multiple times, across different communication sessions 118 to access the tunnel service and be assigned a persistent URL 128 from the tunnel service 122 that is derived from the credentials. For example, at D credentials 132 are supplied to the tunnel service 122 to gain access to functionality provided by the tunnel service 122. The tunnel service 122 verifies the credentials 132 through interaction with the authentication service 126, redirection of the client to authenticate, or in another suitable manner. Upon successful authentication of the client/credentials, access is granted to the tunnel service 122 and the communication module 114 is able to engage in communication sessions 118 via the tunnel service 122.

Additionally, at E the tunnel service 122 generates and returns a persistent URL 128 that is derived based at least in part upon the supplied credentials. For example, the URL may be constructed using a name, numeric identifier, or other identifying string that is reflected by the credentials. As such, the tunnel service 122 is configured to generate and return the same URL each time the same credentials are supplied by an application. This way, the client may connect and disconnect from the tunnel service and engage in multiple sessions while still using the same persistent URL 128 for communications with other endpoints.

Once the persistent URL 128 is generated and returned to the client, the client may store the persistent URL 128 in local storage 116. The persistent URL 128 may then be published publicly or privately to others. Doing so exposes the communication module 114 as a web service 202 that is accessible via the publicly accessible address reflected by the persistent URL 128 as represent by operation F.

In operation, techniques described herein enable client applications, including browser based clients and non-browser based clients to provide web services. Such client applications are configured to act as servers and can be used for, among other purposes, to and from calling of web services supported by the applications. Such uses can include, by way of example and not limitation, pushing messages between endpoints. The various techniques can be used, for example, to implement chat clients using standard protocols and libraries and without requiring any custom code or plug-in installation as noted above.

The client applications can communicate requests for access to a tunnel service 122 implemented via an intermediary server 120. This may include communicating a digital certificate (or other credentials) for the client application to the tunnel service to get a persistent URL 128 that enables the client application to operate as a web service through the tunnel service. Responsive to requesting access, the persistent URL is acquired from the tunnel service. The persistent URL is configured by the tunnel service as a publicly addressable identifier for the client application as the web service. The persistent URL is derived from information contained in the digital certificate or other credentials as discussed above and below. The client application is then able to communicate as the web service with one or more endpoints through the tunnel service using the persistent URL.

In this context, intermediary server 120 functions as an intermediate device that establishes a web presence for the client applications via a persistent server connection. The intermediary server acts as an externally and continuously available HTTP endpoint. This allows for emulation of what would happen if the client application could open a socket and start a web server locally for receiving synchronous requests from servers, and/or processing responses for asynchronous requests. The persistent connection can be established using any suitable technologies or techniques. By way of example and not limitation, such technologies or techniques can include COMET, WebSockets, and the like. The intermediary server 120 can publish the particular web service 202 associated with a client device 102 to the world, for example by publishing a persistent URL 128 for the web service 202 via a directory service 124 or other publishing entity. Other web service clients or servers seeking to communicate with web service 202 can use the published web-service URL to look-up and call the web service 202 via the tunnel service 122.

Figure 3:
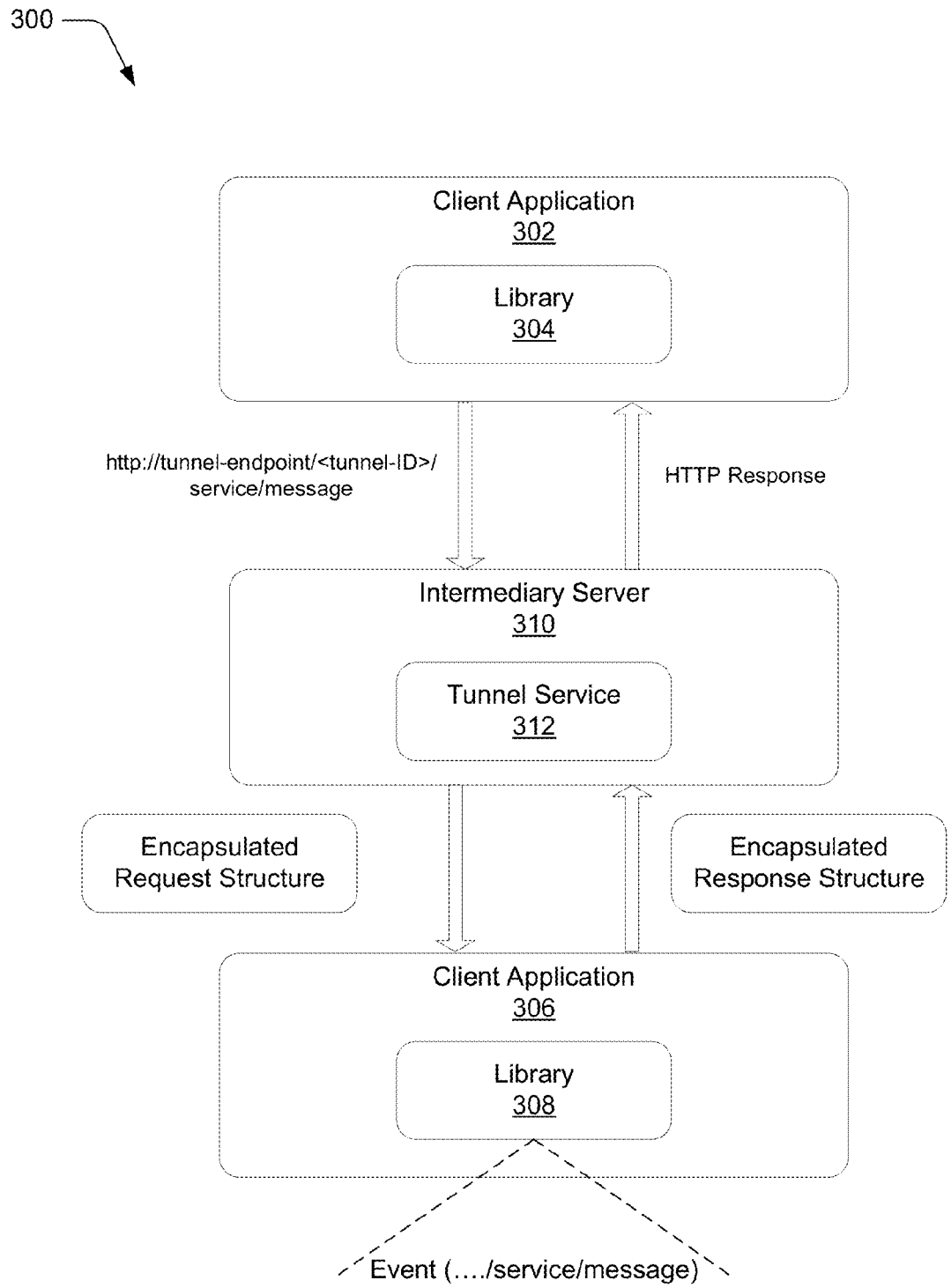
FIG. 3 is an illustration of a communication flow between client applications in accordance with one or more implementations.

FIG. 3 illustrates generally at 300 an example communication flow between client applications in accordance with one or more implementations. In particular, the example of FIG. 3 depicts a communication scenario that involves a client application 302 having a library 304, a client application 306 having a library 308, and an intermediary server 310 that implements a tunnel service 312 through which communications occur. In this example, the two client application each implement one or more web services and wish to communicate with each other. The web services may be implemented using techniques for persistent URLs described in this document.

In the illustrated example, client applications 302, 306 each include a persistent connection with intermediary server 310 indicated by the arrows. The persistent connection can be utilized to receive web service requests from a caller by way of the intermediary server. Any suitable technology can be utilized to enable the persistent connection to be established. In addition, each of the client applications is registered with intermediary server 310 using a respective tunnel ID, such as a persistent URL.

In operation, client applications utilizes standard web protocols to issue a call in the form of an HTTP request. In this specific example, the HTTP request takes the following form:

http://tunnel-endpoint/<tunnel-ID>/service/message

In this example, the tunnel ID in the request may correspond to a persistent URL that is assigned to at least one of the endpoints.

Thus, a call issued by client application 302 includes the tunnel endpoint ("tunnel-endpoint") associated with and identifying intermediary server 310, the tunnel ID ("tunnel-ID") associated with client application 306 and a payload which identifies a web service implemented by client application 306 and data or information that is to be processed by the web service implemented by the web browser ("service/message").

The intermediary server 310 and its tunnel service 312 then process the call by converting it into a standard web structure that can be processed by the web browser. For example, the HTTP request includes a method, a URL, a body and headers. These are utilized to construct a JavaScript structure which is essentially a dictionary having keys and content corresponding to the method, URL, body, and headers. The JavaScript structure is then serialized and encapsulated using JavaScript Object Notation (JSON) to provide an encapsulated request structure. The encapsulated request structure is then communicated by the intermediary server 310 to the client application 306 for processing utilizing the persistent connection. When the client application 306 receives the encapsulated request structure, it can utilize library 308 to fire an event including the data or information received in the encapsulated request structure (i.e. "/service/message") to the web service for processing. Once the data or information is processed by the web service, the client application 306 formulates a response that includes an encapsulated response structure having a payload, e.g., a response structure encapsulated using JSON. The encapsulated response structure is sent to the intermediary server 310. The encapsulated response structure can be sent to the intermediary server using a standard TCP connection. The intermediary server 310, in turn, processes the encapsulated response structure and formulates an HTTP response that is then communicated back to client application 302. The HTTP response can be processed in the usual manner by client application 302.

In addition, the client applications 302, 306 may communicate directly with one another by making HTTP requests of one another using the following format:

http://tunnel-endpoint/<respective-tunnel-ID>

In this example, the tunnel ID employed for the direct communications may correspond to a persistent URL that is assigned to at least one of the endpoints.

Further, in at least some embodiments, if a web service is implemented using Node.JS, which is a server-side JavaScript programming language and execution environment, the same code may be moved from the server to any client by simply substituting the tunnel endpoint library for the server instantiation library, as will be appreciated by the skilled artisan. Accordingly, instead of registering to receive incoming Web requests, registration can take place with the client-side JavaScript implementation of the tunneling software which produces identical events as would have been produced had the software been running in the Node.JS environment.

Figure 4:
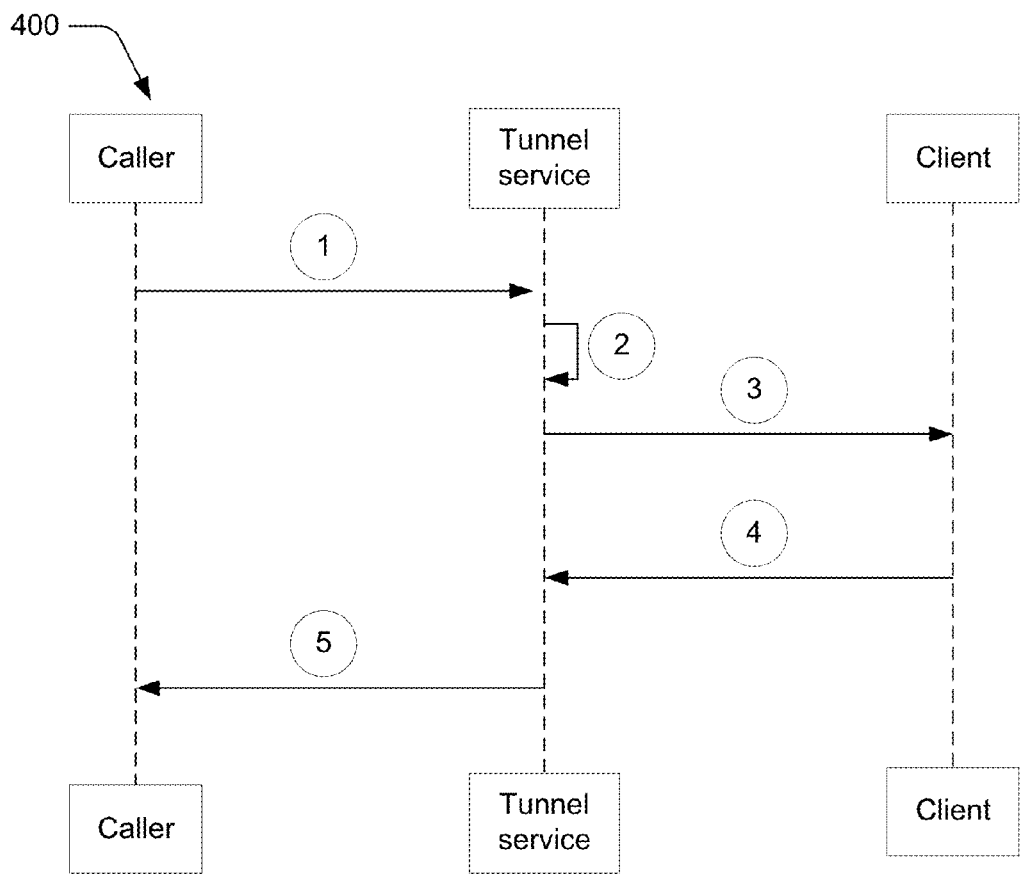
FIG. 4 is an illustration of an example sequence flow between a caller, a tunnel service, and a client in accordance with one or more implementations.

FIG. 4 illustrates an example sequence diagram, generally at 400, which shows how an external HTTP request is encapsulated into JSON and then sent over a persistent connection to a client, e.g., web browser or other client application. In this example, authentication is performed but not illustrated. Specifically, authentication may be performed either at the tunnel service by restricting authorized callers to send messages to the clients or at the client (e.g., browser) itself or both.

In the example, a number of actions are illustrated as being performed by entities including a caller, a tunnel service, and a client. Each of the actions is enumerated with an encircled number, which is then qualified below. As noted above, the caller can comprise any suitable entity including, by way of example and not limitation, an end user computing device, a server, a suitably-configured application executing on either the computing device or server, a web browser, and the like. Initially, the caller makes an HTTP request at "1". Such can, but need not take place over a persistent connection. For example, the HTTP request can be made over a TCP connection that enables communication with the tunnel service. In this example, the HTTP request is a POST and has the form shown just below the illustration. The "connID" corresponds to the tunnel-ID with which the client is registered. The "myURL" corresponds to the "service/message" which is part of the payload.

The tunnel service receives the HTTP request and, at "2" selects a connection that matches "connID". The tunnel service serializes the HTTP request and encapsulates it in JSON at "3". The serialized encapsulated request structure is shown just below the illustration. The client receives the encapsulated request structure over a persistent connection and, using a suitably-configured library, processes the encapsulated request structure and fires an appropriate event containing information and data to enable the client-supported web service to process the information and data. The client then prepares an encapsulated response structure that is encapsulated in JSON and returns the encapsulated response structure at "4" to the tunnel service. The structure of the encapsulated response structure is shown just below the illustration. This response can be sent to the tunnel service using a standard TCP connection.

The tunnel service then processes the encapsulated response structure and prepares an HTTP response that is sent at "5" to the caller. The structure of the HTTP response is shown just below the illustration. The response includes an HTTP status code 200 indicating that the request was fulfilled, along with a payload that includes information and data resulting from the web service's processing of the caller's request. The response can now be processed by the caller as a typical HTTP response.

In addition to the above discussion, additional considerations can be taken into account. As an example, consider the following.

Additional Considerations

With respect to the techniques discussed above and below, consider the following additional aspects related to security, extensibility, and scalability. In one or more embodiments, to facilitate confidentiality, communication between callers and the intermediary server, and the intermediary server and client, can take place over a secure transport, such as, by way of example and not limitation, utilizing Transport Layer Security (TLS) or Secure Sockets Layer (SSL). In the case of HTTP communication, HTTPS can be utilized. Further, to ensure that service requests are limited to authorized systems, a service account can be utilized. Service accounts can utilize account keys. In this manner, the caller of a service can sign its HTTP request with this key, thus facilitating the proof that it indeed possesses the key and associated account. This signature can be implemented using any suitable cryptographic method, e.g. HMAC (Hash-based Message Authentication Code). Such signature can be attached to the HTTP request in an additional authorization header. This signature can be checked by the service upon receipt of the request, and if the check is successful, the service request can be filled.

In one approach, the client connects to the tunnel service 122 and is load-balanced onto a proxy server. The client provides its credentials such as a public key certificate, password/ID, or other shared secret to the service. In instances in which a digital certificate and/or key pair are employed, the client proves possession of the associated private key. For example, the initial connection may be formed as a mutual TLS connection, or the client can sign a token which is sent down from the service after the connection is established to prove validity. The act of proving certificate validity and possession of the private key is sufficient to authorize the client and authenticate the client to use of service. A persistent URL 128 can be derived based on the credentials as described herein, returned to the client, and published.

In some implementations, the client provides the private key to the "trusted" tunnel service. The tunnel service uses the client's private key to successfully negotiate an SSL/TLS connection to the appropriate URL (e.g., a target endpoint). In this scenario, the service acts as a "man-in-the-middle," which is able to see and handle traffic for transactions between endpoints.

For added security, the tunnel service may act as a proxy to facilitate end-to-end security by establishing an SSL/TLS connection directly between the endpoints. This may be accomplished by using the public/private key pair for a client (e.g., as stored in local storage 116) to push appropriate parts of the SSL/TLS handshake down to the clients. The tunnel service then proxies the necessary parts of the SSL/TLS handshake down to the target client, which is in possession of the private key, and also proxies replies back to the calling client. In this approach, the SSL/TLS connection is negotiated between the endpoints with the tunnel service acting as a proxy. As such, traffic directed via the tunnel service for the secure session is not visible to the tunnel service in the clear since the tunnel service does not possess the private key and is not acting as a "man-in-the-middle" in this scenario.

In any case, when another system wishes to reach one of the web services exposed by a target client at the persistent URL, the calling client looks-up the hostname in the URL, such as via a directory service 124. In response to a call having the hostname, the tunnel service runs a dynamic DNS look-up to obtain the IP address(es) of the specific host device (tunnel service server) to which the target client/web service is currently connected. The tunnel service then operates to route traffic from the communication sessions between the endpoints using the appropriate servers. In this manner, directory service 124 or other dynamic DNS component is utilized to enable dynamic IP address look-ups based on the URLs and route requests to the correct server instances for the tunnel service 122 associated with clients/web services that are hosted via the server instances.

As a further consideration, if the caller of the service is a client rather than a server, an additional provision can be utilized in order to ensure security of the account key. On the client, typically the key cannot be assumed as safely stored, as it can be when stored on the server. To this end, temporary account keys can be utilized coupled with a procedure for obtaining these in exchange for other security credentials. Such key would have limited validity, for example, by expiring after one day, or within a pre-defined time period. Further, a client that connects to the service can also be asked to authorize itself, using the same technique of temporary keys as mentioned above.

In addition, from a security standpoint, a mechanism can be utilized by a tunnel service to ensure that authorized systems can have their web service requests relayed to any given client. This is accomplished using cryptographically random connection IDs that are assigned to the client connection, and are embedded in the client's individual service URL. The client gives that URL only to the systems it wants to send requests to. Any other system will not be able to make requests by the simple fact that it does not know, or cannot guess, the service URL/connection ID assigned to the client.

From an extensibility standpoint, consider the following. As noted above, callers can comprise any suitable type of entity. For example, in the discussion above, a web browser was used to initiate calls to a particular web service or other web browser. Consider the situation in which an operating system itself can maintain a persistent connection with a suitably-configured intermediary server. In this instance, the operating system can expose its individual resources as URLs that can be accessed using the techniques described above. For example, individual tiles that might appear on a display screen can be associated with individual URLs. Content associated with the individual tiles can be updated by a service using a push model. For example, rather than having the operating system fetch or otherwise acquire updates proactively, updates can be pushed to operating system resources at their associated URLs. So, for example, if a tile is to be updated, a web service can use the tile's associated URL and make an HTTP POST request that gets tunneled to the particular tile. For example, the computing system may have a tile associated with weather updates. Rather than having to go retrieve the weather updates, such updates can be pushed to the tile using the techniques described above.

As another example, consider calling services. Utilizing calling services, clients can call one another using, for example, Voice over Internet Protocol (VoIP). In these scenarios, if a client has an incoming call, rather than utilizing specialized call servers, the techniques described above can be utilized in connection with HTTP-based call servers to be able to send an HTTP request associated with an incoming call directly to a client, resulting in a push call notification.

With respect to web browser scenarios, consider the following. RTC-Web (Real-Time Collaboration on the World Wide Web) is an effort to achieve a standardized infrastructure in web browsers on which real-time interactive communication between users of the web can be achieved. Using RTC-Web, peer-to-peer audio and video media sessions can be established between web browsers. Using data channels established between browsers through RTC-Web, web services that are supported by the web browsers can utilize the techniques described above to bypass the intermediary server to communicate with one another. In this manner, library functions that are implemented by the web browsers can make HTTP calls to one another to access and utilize web services supported by the web browsers.

Having considered an example sequence diagram and other considerations in accordance with one or more embodiments, consider now a discussion of procedures in accordance with one or more implementations.

Example Procedures

Figure 5:
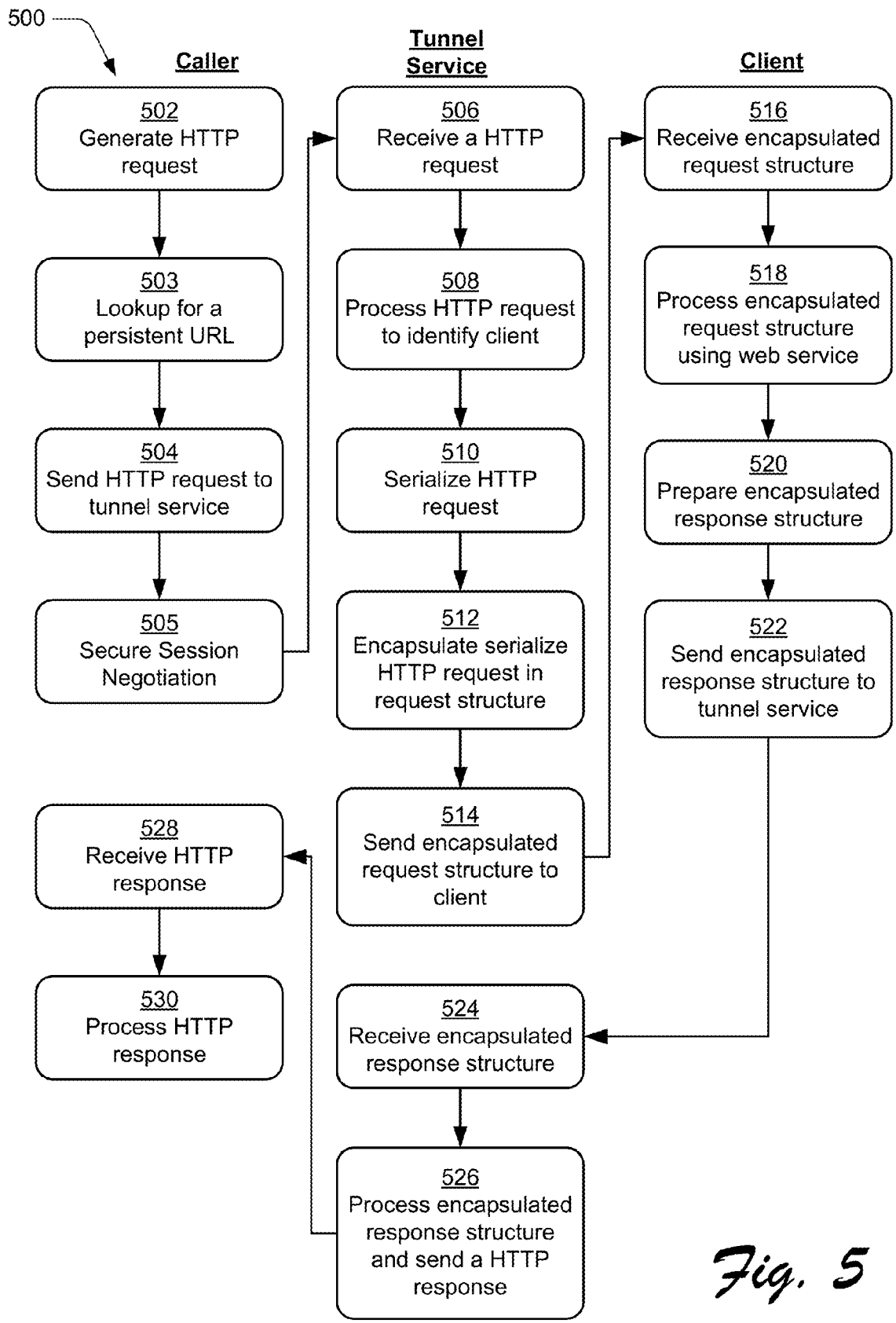
FIG. 5 is a flow diagram depicting an example procedure for a communication session engaged in by a caller and a client through a tunnel service in accordance with one or more implementations.

FIG. 5 depicts a communication flow 500 that takes place between a caller, a tunnel service, and a client in a manner that enables the client to provide a web service. The communication flow 500 may be implemented utilizing the previously described systems and devices. At block 502, a caller generates an HTTP request associated with a web service provided by a suitably configured client application. Examples of HTTP requests are provided above. At block 503, a look-up is performed for a persistent URL associated with the request. As illustrated, the look-up is performed via a caller, however the look-up may alternatively be performed by the tunnel service 122 following an initial connection. In either case, the lookup may be performed via a directory service 124 that implements a directory 130. In one approach, the look-up involves a dynamic DNS look-up in which a hostname (e.g., published web service name) is used to ascertain a corresponding address and/or host device(s) for the target web service.

Block 504 sends the HTTP request to a tunnel service. This request can be sent over a standard TCP connection. Then, a secure session is negotiated using SSL/TSL per block 505. The secure session can be established by the tunnel service 122 on behalf of endpoints with the tunnel service as a man-in-the middle as noted previously.

Alternatively, as also mentioned previously, the tunnel service may operate as a proxy to enable end-to-end security by pushing negotiation of the secure session down to the clients. In this approach, the tunnel service routes traffic for endpoint communications, but does not have the ability to see the traffic in the clear. As such, security is increased.

Block 506 receives the HTTP request and block 508 processes the HTTP request to identify the client. This can be performed in any suitable way, examples of which are provided above. In at least some approaches, the target client and/or web service is identified using a persistent URL 128 as described in this document. Block 510 serializes the HTTP request and block 512 encapsulates the serialized HTTP request in a request structure. This can be performed in any suitable way. In at least some embodiments, the serialized HTTP request is encapsulated in JSON as described above. Block 514 sends the encapsulated request structure to the client. In one or more embodiments, the encapsulated request structure is sent over a persistent connection maintained between the tunnel service and the client.

Block 516 receives, at the client, the encapsulated request structure. Block 518 processes the encapsulated request structure using, at least in part, a web service. Block 520 prepares an encapsulated response structure that includes at least data and information associated with execution of the web service. Block 522 sends the encapsulated response structure to the tunnel service. In one or more embodiments, the encapsulated response structure can be sent over a standard TCP connection.

Block 524 receives, at the tunnel service, the encapsulated response structure. Block 526 processes the encapsulated response structure and sends an HTTP response to the caller. Examples of how this can be done are provided above.

Block 528 receives, at the caller, the HTTP response and block 530 processes the HTTP response. This can include processing the data and information that is included in the HTTP response as a result of the client executing the Web service. Further details regarding operations of a client/web service and tunnel service in connection with assigning and using persistent URLs are discussed in relation to the following example procedures of FIG. 6 and FIG. 7.

Figure 6:
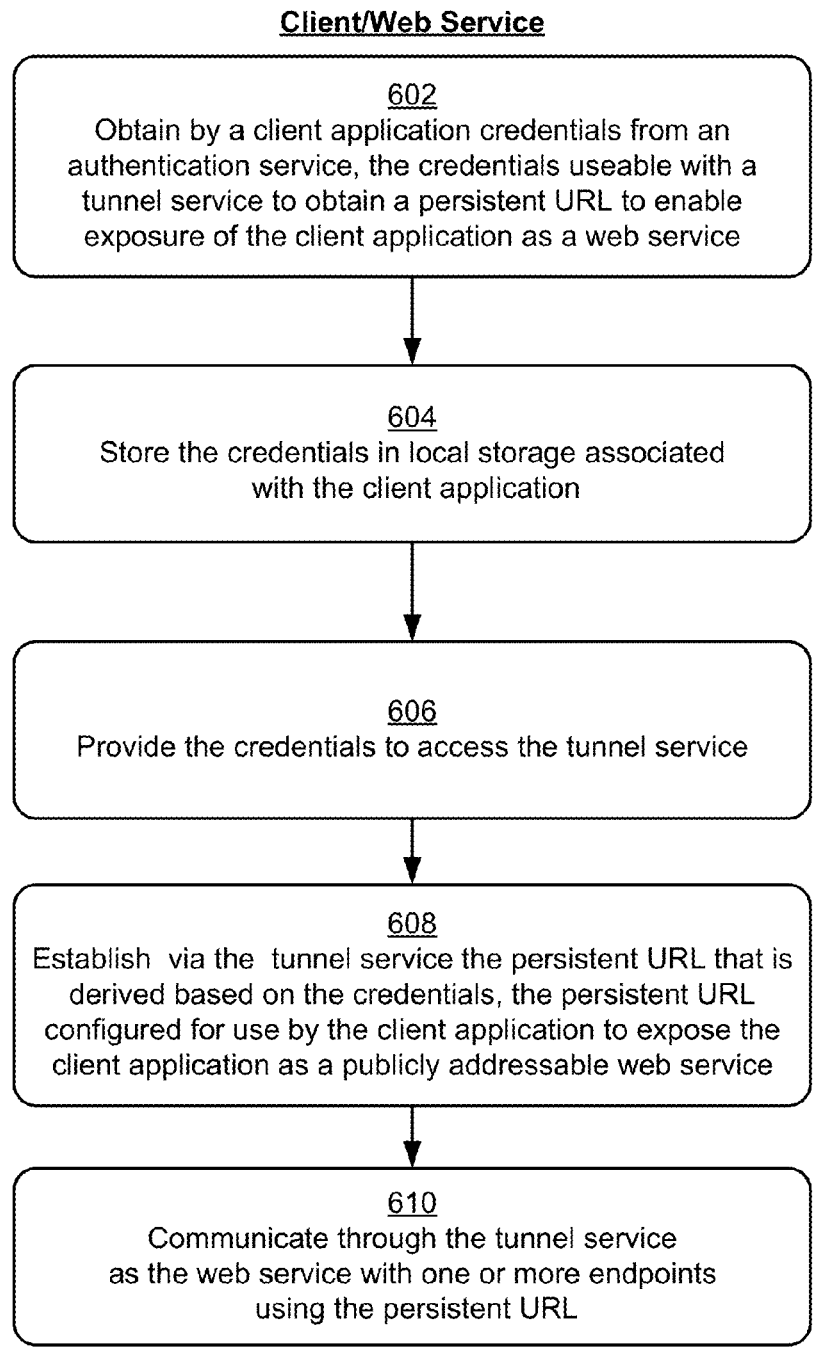
FIG. 6 is a flow diagram depicting an example procedure in which a persistent URL usable to expose a client as a web service is established through a tunnel service in accordance with one or more implementations.

FIG. 6 is a flow diagram depicting an example procedure 600 in which a persistent URL usable to expose a client as a web service is established through a tunnel service in accordance with one or more implementations. The procedure may be performed via a suitable client/web service, such as by way of a client device 102 as described above and below.

A client application obtains credentials from an authentication service that are useable with a tunnel service to obtain a persistent URL to enable exposure of the client application as a web service (block 602). Credentials 132 may be obtained from an authentication service 126 in the manner previously described. Various different kinds of credentials are contemplated. In one or more implementations the credentials are provided in the form of a digital certificate signed by a certificate authority (CA) and associated with a public-private key pair assigned to the client application. The public-private key pair can be used among other things to validate the client for access to resources and establish secure sessions via SSL/TSL and/or other security protocols. In some scenarios, credentials in the form of a username and password combination are employed in addition or as an alternative to using digital certificates. The username and password combination provides access to the tunnel service and can also be used to derive a persistent URL.

The credentials are stored in local storage associated with the client application (block 604) and then the credentials a provided to access the tunnel service (block 606). The credentials allow the tunnel service to validate the client for access to resources provided by the service. Additional, credentials in the form of a digital certificate (or comparable formats) enable negotiation of a secure session between the client application and an endpoint using the tunnel service as a proxy. In this approach, the tunnel service is utilized as a proxy for establishment of the secure session between endpoints and as such the tunnel service is unable to derive and does not possess security parameters for the secure session. Consequently, traffic directed via the tunnel service for the secure session is not visible to the tunnel service as clear-text traffic since end-to-end security between the endpoints is implemented.

A persistent URL is established via the tunnel service that is derived based on the credentials and configured for use by the client application to expose the client application as a publicly addressable web service (block 608). For example, interactions to establish a persistent URL 128 may occur with a tunnel service 122 that is implemented by an intermediary server 120 as described herein. Generally, a persistent URL 128 is derived using an appropriate name or identifier for the corresponding application/web service that is derived from credentials 132 supplied for access to the service. In this way, the persistent URL is tied to the credentials rather than to a session. The persistent URL has a lifespan that is tied to the validity period for the credentials. Typically, the validity period for the credentials extends at least one day but could last for one or more months or even for a year or longer. Consequently, the persistent URL persists for a significant period of time that corresponds to the validity period and is valid across multiple sessions between the client application and the tunnel service.

For example, the persistent URL may be generated to incorporate an identifying string extracted from the credentials as a domain identifier. The client application may have associated local storage 116 in which credentials used to obtain a persistent URL are stored across multiple sessions. By so doing, the credentials are usable multiple times to obtain the same persistent URL that is derived by the tunnel service from the credentials when the credentials are supplied to the tunnel service for validation. In the case of a digital certificate, the identifying string may be a certificate name that is include as a parameter in the certificate. For other kinds of credentials, an appropriate username, code, string, or service name tied to the credentials may be employed as the identifying string. For example, a name or identifier associated with or derived from a username and password combination can be used to form a suitable URL. The name/identifier may be extracted and included in an encrypted blob or cookie that is returned to the client for storage and repeated use across multiple sessions.

Communications as the web service with one or more endpoints occur through the tunnel service using the persistent URL (block 610). The persistent URL that is generated enables the client application to engage in communications as a web service. This includes asynchronous web communications with other web services and/or endpoints using the tunnel service 122 to route traffic for the asynchronous web communications. In particular, the persistent URL can be used to interact with an application 112 as a web service and to route communications (e.g., requests responses) to appropriate endpoints.

In accordance with techniques described herein, communicating as the web service may include publishing the persistent URL with a directory service 124 to enable endpoints to resolve the persistent URL for the client application and direct requests using the persistent URL. A mentioned, the persistent URL and/or a hostname that is usable to resolve the persistent URL may be published publicly or privately. In addition, a complete address reflected by the persistent URL may be shared (e.g., a link) publicly or to selected entities to enable access to the web service using the shared address.

Figure 7:
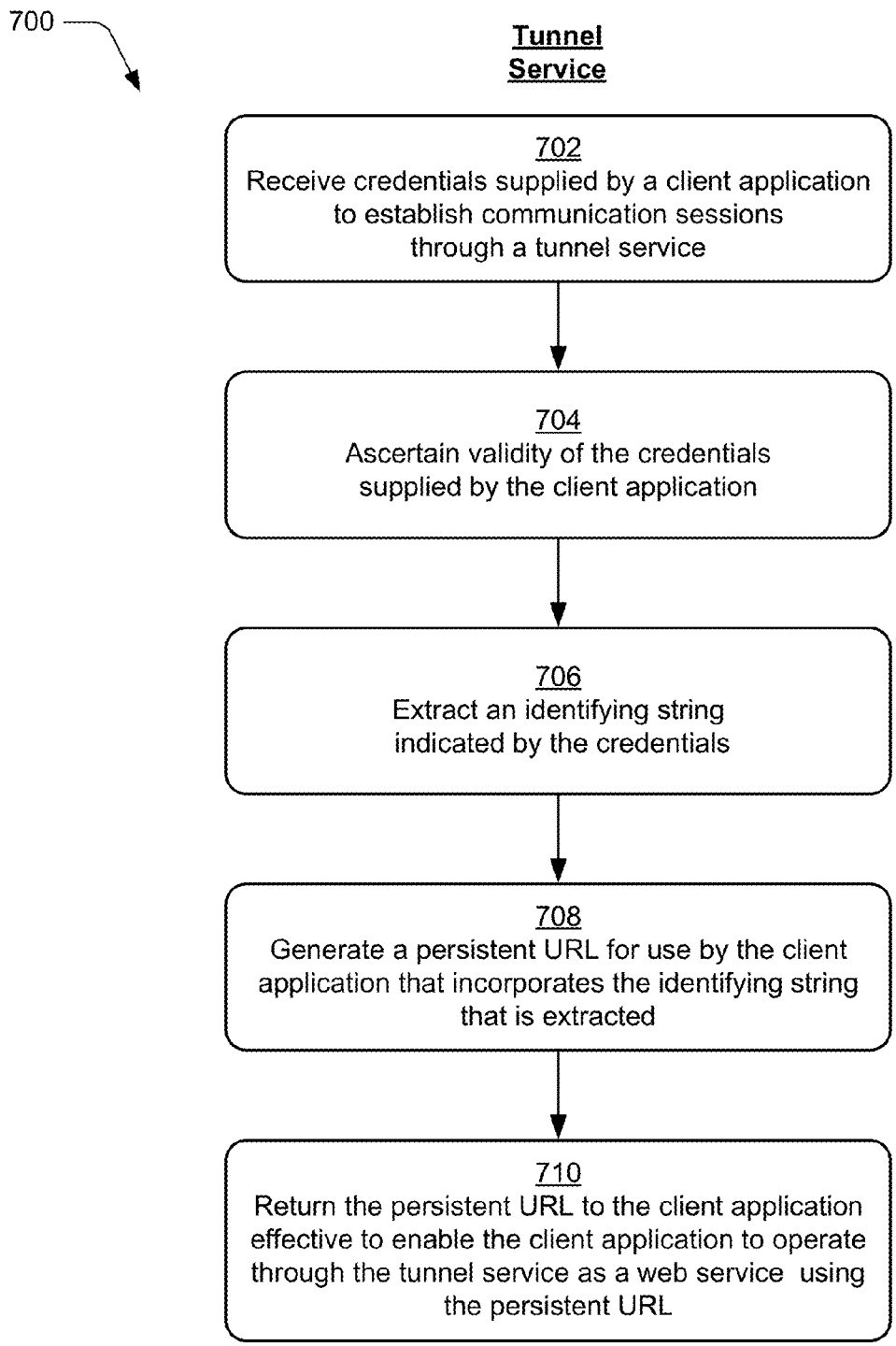
FIG. 7 is a flow diagram depicting an example procedure in which a tunnel service generates a persistent URL for use by a client in accordance with one or more implementations.

FIG. 7 is a flow diagram depicting an example procedure 700 in which a tunnel service generates a persistent URL for use by a client in accordance with one or more implementations. The procedure may be performed via a suitable service provider/service such as by way of a service provider 106 and/or intermediary server 120 that implements a tunnel service 122 as described above and below.

Credentials supplied by a client application to establish communication sessions through a tunnel service are received (block 702) and validity of the credentials supplied by the client application is ascertained (block 704). These operations may occur in the manner previously described. The validation of credentials can occur directly via the tunnel service 122 or through redirection to an authentication service 126. Upon successful authentication, the client application is granted access to functionality of the tunnel service 122. In addition, operations to generate a persistent URL 128 for the client application occur when the client application is authorized to use the service. To provide the persistent URL, an identifying string indicated by the credentials is extracted (block 706). The identifying string may be a domain name or other suitable identifier that is incorporated with supplied credentials and can be extracted for inclusion in the URL. Then, a persistent URL is generated for use by the client application that incorporates the identifying string that is extracted (block 708). This involves forming the URL as an address that includes the identifying string as a domain name or other portion of the address. For example, the URL may be substituted in as a tunnel ID per the example format previously discussed herein. The tunnel service 122 is configured to derive the same persistent URL 128 from the credentials 132 across multiple sessions as long as the credentials are valid when supplied to the tunnel service. In at least some implementations, the credentials comprise a digital certificate and the identifying string used to generate the persistent URL comprises a certificate name extracted from the certificate.

Once created, the persistent URL is returned to the client application effective to enable the client application to operate through the tunnel service as a web service using the persistent URL (block 710). Operations of a client a web service occur in accordance with the techniques and examples described throughout this document. In general, communication sessions 118 are established between endpoints through the tunnel service 112 using the persistent URL 128. The tunnel service 122 then operates to route communications between the endpoints for the communication sessions. To do so, the tunnel service may implement an encapsulated request and response structure, details of which are described in relation to the previous figures and examples. In one or more implementations, routing of communications between endpoints involves acting as a proxy for a secure session negotiated between a client application and another endpoint using the credentials. In this case, traffic directed via the tunnel service for the secure session is not visible to the tunnel service in the clear. Of course a man-in-the-middle approach that does not use end to end security may also be employed in some scenarios.

Having described example procedures in accordance with one or more implementations, consider now an example system and device that can be utilized to implement aspects of the techniques described herein.

Example System and Device

Figure 8:
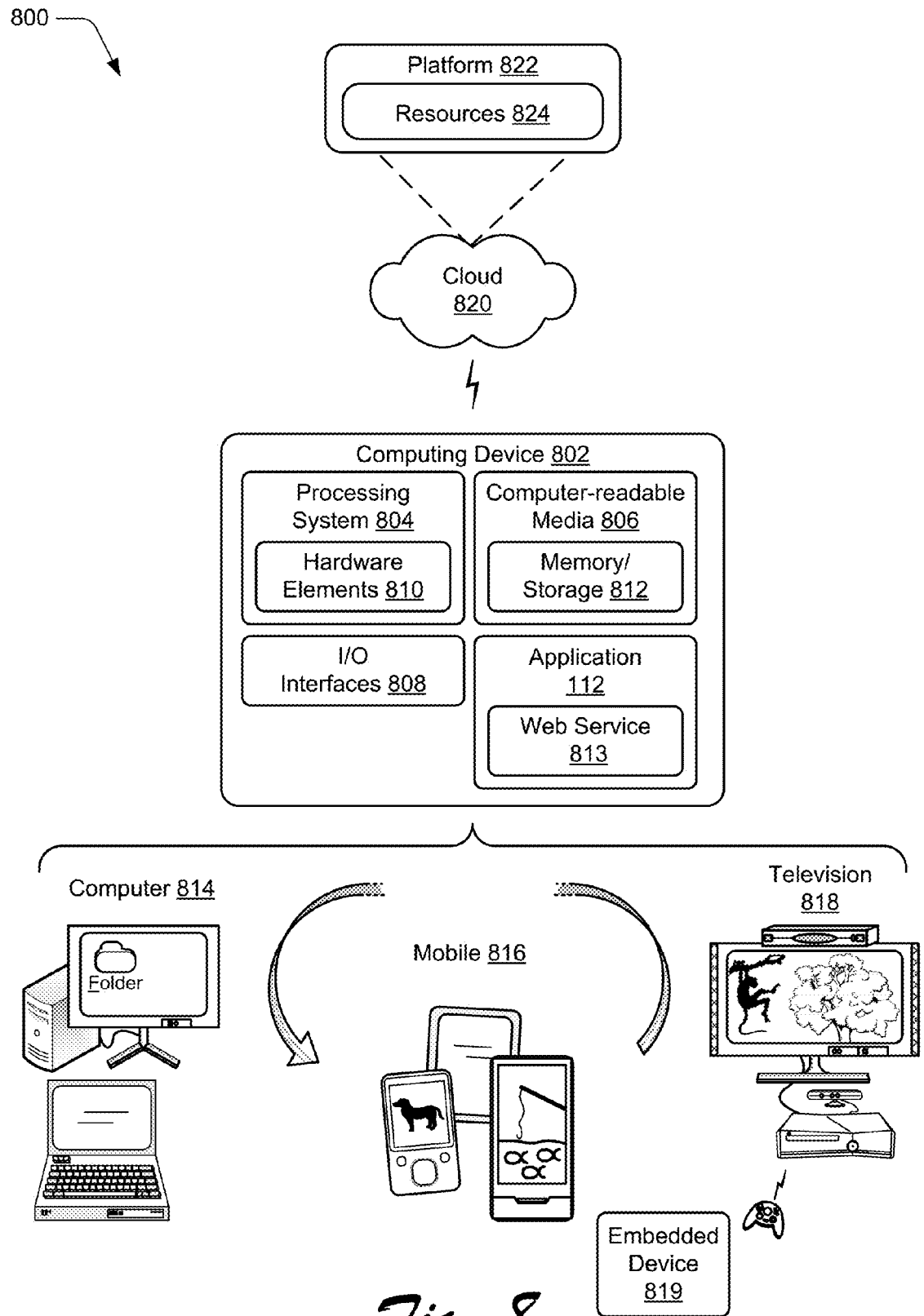
FIG. 8 illustrates an example system including various components of an example device that can be implemented as any type of computing device or system operable to implement aspects of the techniques described in this document.

FIG. 8 illustrates an example system generally at 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 808 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Computing device 802 also includes applications 112 configured to implement one or more web services 813 and which can utilize persistent URLs 128 in accordance with the techniques described herein.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, television 818, and embedded device 819 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The computing device 802 may also be implemented as an embedded system or embedded class of device 819. Embedded devices are typically designed for specific control functions. As such, embedded devices can be typically dedicated to handling a particular task. Embedded devices can be widely ranging from such things as digital watches, media players, light switches, traffic lights, factory controllers, telephone switches, various other types of consumer electronics, GPS receivers, printers, household appliances such as microwave ovens, washing machines, dishwashers, HVAC systems including networked thermostats, home automation devices that use wired or wireless networking to control such things as lights, climate, security, audio/visual, surveillance, and the like. Other embedded devices can be used in transportation systems, various types of motors, medical equipment for such things as vital sign monitoring, medical imaging, and the like.

The techniques described herein may be supported by these various configurations of the computing device 802 and are not limited to the specific examples of the techniques described herein. This functionality may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services, such as web services, provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the aspects of the techniques discussed in this document have been described in language specific to structural features and/or methodological acts, it is to be understood that the subject matter defined in the appended claims are not necessarily limited to the specific features or acts described. Rather, the specific features and acts are disclosed as example forms of implementing the various claimed aspects and techniques.

What is claimed is:

1. A method implemented by a client device comprising:
   requesting access to a tunnel service implemented via an intermediary server including communicating a digital certificate for a client application to the tunnel service to get a persistent URL that enables the client application to operate as a web service through the tunnel service, the tunnel service configured to derive the same persistent URL from the digital certificate each time the digital certificate is presented for access to the tunnel service during a validity period of the digital certificate;
   responsive to requesting access, acquiring the persistent URL from the tunnel service, the persistent URL configured by the tunnel service as a publicly addressable identifier for the client application as the web service that is derived from information contained in the digital certificate; and
   communicating as the web service with one or more endpoints through the tunnel service using the persistent URL.

2. The method of claim 1, wherein communicating comprises publishing the persistent URL with a directory service to enable endpoints to resolve the persistent URL for the client application and direct requests using the persistent URL.

3. The method of claim 2, wherein the directory service comprises a dynamic domain name system (DNS) component configured to map the persistent URL to a DNS name associated with the web service and an IP address of a corresponding server of the tunnel service that is hosting the web service.

4. The method of claim 1, wherein the persistent URL is valid across multiple sessions between the client application and the tunnel service.

5. The method of claim 1, wherein the digital certificate is signed by a certificate authority associated with a public-private key pair assigned to the client application.

6. The method of claim 1, wherein the digital certificate is associated with credentials, the credentials further comprising a username and password combination for access to the tunnel service.

7. The method of claim 1, wherein the digital certificate enables negotiation of a secure session between the client application and an endpoint using the tunnel service as a proxy, such that the tunnel service does not possess security parameters for the session and traffic directed via the tunnel service for the secure session is not visible to the tunnel service as clear-text traffic.

8. The method of claim 1, wherein the persistent URL is generated to incorporate an identifying string extracted from the digital certificate as a domain identifier.

9. The method of claim 1, wherein the persistent URL enables the client application to engage in asynchronous web communications with other web services using the tunnel service to route traffic for the asynchronous web communications.

10. A computing device comprising:
a processing system; and
one or more computer readable media storing instructions which, when executed, cause the computing device to perform operations comprising:
requesting access to a tunnel service implemented via an intermediary server including communicating a digital certificate for a client application to the tunnel service to get a persistent URL that enables the client application to operate as a web service through the tunnel service, the tunnel service configured to derive the same persistent URL from the digital certificate each time the digital certificate is presented for access to the tunnel service during a validity period of the digital certificate;
responsive to requesting access, acquiring the persistent URL from the tunnel service, the persistent URL configured by the tunnel service as a publicly addressable identifier for the client application as the web service that is derived from information contained in the digital certificate; and
communicating as the web service with one or more endpoints through the tunnel service using the persistent URL.

11. The computing device of claim 10, further comprising local storage associated with the client application in which the digital certificate is stored to enable repeated use of the digital certificate to access the tunnel service and get the same persistent URL derived from the digital certificate.

12. The computing device of claim 10, wherein the validity period of the digital certificate is at least one day.

13. The computing device of claim 10, further comprising causing negotiation of a secure session between the web service and one or more endpoints using the digital certificate for communications engaged in via the tunnel service with the persistent URL, the secure session negotiated with the tunnel service acting as a proxy for establishment of the secure session such that the tunnel service in unaware of security parameters for the session and traffic directed via the tunnel service for the secure session is not visible to the tunnel service as clear-text traffic.

14. A system to facilitate provision of web services by client applications comprising:
a processing system including one or more hardware elements;
one or more computer-readable media storing computer readable instructions which, when executed via the processing system, implement a tunnel service configured to perform operations including:
receiving credentials supplied by a client application to establish communication sessions through the tunnel service;
ascertaining validity of the credentials supplied by the client application;
when the credentials are valid:
extracting an identifying string indicated by the credentials;
generating a persistent uniform resource locator (URL) for use by the client application that incorporates the identifying string that is extracted; and
returning the persistent URL to the client application effective to enable the client application to operate through the tunnel service as a web service using the persistent URL, wherein the client application comprises an application having associated local storage in which credentials used to obtain the persistent URL are stored across multiple sessions, such that the credentials are usable to obtain the same persistent URL derived from the credentials by the tunnel service when the credentials are supplied to the tunnel service for validation.

15. The system of claim 14, further comprising routing communications between endpoints for communication sessions established through the tunnel service the tunnel service using an encapsulated request and response structure.

16. The system of claim 15, wherein routing communications between endpoints comprises acting as a proxy for a secure session previously negotiated between the client application and another endpoint using the credentials, such that traffic directed via the tunnel service for the secure session is not visible to the tunnel service as clear-text traffic.

17. The system of claim 16, wherein the credentials comprise a digital certificate and the identifying string used to generate the persistent URL comprises a certificate name extracted from the certificate.

18. The system of claim 14, wherein tunnel service is configured to derive the same persistent URL from the credentials across multiple sessions as long as the credentials are valid when supplied to the tunnel service.

19. The system of claim 18, wherein credentials are valid for at least one day.

20. The method of claim 1, wherein the validity period of the digital certificate is at least one day.

* * * * *